(12) United States Patent
Yamada

(10) Patent No.: US 6,751,168 B2
(45) Date of Patent: Jun. 15, 2004

(54) CHANGER DEVICE CAPABLE OF PLAYING BACK TRACKS WITHOUT A DISK

(75) Inventor: Ryuichi Yamada, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 290 days.

(21) Appl. No.: 10/105,523

(22) Filed: Mar. 25, 2002

(65) Prior Publication Data

US 2002/0136099 A1 Sep. 26, 2002

(30) Foreign Application Priority Data

Mar. 26, 2001 (JP) .......................................... 2001-087122

(51) Int. Cl.[7] .............................................. G11B 21/08
(52) U.S. Cl. ..................................................... 369/30.23
(58) Field of Search ........................... 369/30.23, 30.29, 369/30.08, 30.09, 30.3, 47.32, 47.33, 47.34; 711/3.4, 111, 112

(56) References Cited

U.S. PATENT DOCUMENTS

| 5,301,172 | A | * | 4/1994 | Richards et al. | ......... 369/30.04 |
|---|---|---|---|---|---|
| 5,442,598 | A | * | 8/1995 | Haikawa et al. | ......... 369/30.23 |
| 5,974,006 | A | * | 10/1999 | Nakabo | ................ 369/30.23 |
| 6,219,311 | B1 | * | 4/2001 | Mitsuno | ............... 369/30.23 |
| 6,330,211 | B1 | * | 12/2001 | Smelt | ..................... 369/30.1 |
| 6,349,077 | B1 | * | 2/2002 | Smelt | ..................... 369/30.1 |
| 6,683,825 | B2 | * | 1/2004 | Sato | ....................... 369/30.23 |

FOREIGN PATENT DOCUMENTS

| JP | 07176131 | 7/1995 |
|---|---|---|
| JP | 09017165 | 1/1997 |
| JP | 09161462 | 6/1997 |

* cited by examiner

Primary Examiner—Tan Dinh

(57) ABSTRACT

A changer device includes a playback drive for playing back tracks recorded on a disk. The changer device also includes: a memory for storing playback signals of each of the tracks recorded on the disk; a recording-history information management memory for storing recording-history information of the tracks related to the playback signals stored in the memory; and a memory control unit for allowing the memory to store in order the playback signals of the tracks played back by the playback drive, and for allowing the recording-history information management memory to store the recording-history information of the tracks related to the playback signals stored in the memory.

13 Claims, 6 Drawing Sheets

CHANGER DEVICE CAPABLE OF PLAYING BACK TRACKS WITHOUT A DISK

BACKGROUND OF THE INVENTION

1. Field of the Invention

The present invention relates to a device, such as a disk changer device, for storing and playing back information recorded on a recording medium such as a disk. The disk may be a CD, an MD and so forth.

2. Description of the Related Art

FIG. 6 is a block diagram which schematically shows the internal configuration of a disk changer device in a device for storing and playing back information recorded on a recording medium of the known art.

In FIG. 6, the disk changer device 100 (hereinafter simply referred to as the changer device) comprises: a playback drive 102 for driving and playing back a disk selected from disks 101, though only one disk is depicted for simplicity in FIG. 6; a decoder 103 for decoding playback signals that are driven and played back by the playback drive 102; a D/A converter 104 for performing analog conversion of the playback signals decoded in the decoder 103 so as to perform audio output of the playback signals; a contents-related information extracting unit 105 for extracting contents-related information in the disks 101 from the playback signals decoded in the decoder 103; a key operation unit 106 for inputting various commands; a display unit 107 for displaying various information; and a controller 108 for controlling the whole changer device 100.

The contents-related information corresponds to information related to tracks recorded on the disks 101, such as contents IDs for identifying the tracks, names of the tracks, and playing time of the tracks.

Next, the operation of the changer device 100 of the known art is described below.

The changer device 100 shown in FIG. 6 selects a disk to be played back from the disks 101 in the changer device 100, and places the selected disk 101 to be played back in the playback drive 102. The playback drive 102 obtains the playback signals by driving and playing back the selected disk 101, and the playback signals are supplied to the decoder 103.

The decoder 103 decodes the playback signals, and transmits the decoded playback signals to the D/A converter 104. The D/A converter 104 performs analog conversion of the playback signals so as to perform audio output thereof.

The contents-related information extracting unit 105 extracts the contents-related information from the playback signals decoded in the decoder 103, and transmits the contents-related information to the controller 108.

The controller 108 displays a part of the contents-related information on the display unit 107.

Thus, the changer device 100 of the known art drives and plays back the selected disk 101 therein so as to play back the tracks recorded on the selected disk 101. The changer device 100 also extracts the contents-related information of the tracks recorded on the selected disk 101 so as to display on the display unit 107 the names, the playing time and so forth of each of the tracks. Accordingly, a user is able to obtain the information of the track being played back while listening thereto.

According to the changer device 100 of the known art, however, it is necessary to drive and play back the selected disk 101 in the playback drive 102 for playing back the tracks. Therefore, the changer device 100 is not able to play back the tracks when the selected disk 101 is not therein.

SUMMARY OF THE INVENTION

The present invention has been made in view of the problem described above, and it is an object of the present invention to provide a device for storing and playing back information recorded on a recording medium, in which a track can be played back even if a disk is not present in the device.

To this end, according to the present invention, there is provided a device for storing and playing back information recorded on a recording medium, comprising: playback means for playing back a plurality of tracks recorded on the recording medium, to generate playback signals; memory means for storing the playback signals; history-storing means for storing recording-history information of the tracks related to the playback signals stored in the memory means; and memory control means for allowing the memory means to store in sequence the playback signals of the tracks played back by the playback means, and for allowing the history-storing means to store the recording-history information of the tracks related to the playback signals stored in the memory means.

With these features, after the recording medium has been played back and the playback signals have been stored in the storing means, a track having the playback signals stored in the storing means can be played back, even if the recording medium is not present in the device.

The recording-history information may include identification information and recording history related to the tracks stored in the memory means.

Accordingly, the stored information can be preferably managed.

Preferably, the device further comprises mode-setting means for switching between a recording medium playback mode in which the tracks recorded on said recording medium are played back by the playback means and a history-playback mode in which the tracks related to the playback signals stored in the memory means are played back by the memory control means.

Accordingly, the recording medium playback mode and the history-playback mode can be set arbitrarily.

The history-playback mode may be set by the mode-setting means when the recording medium is not present in the device and when the playback signals are stored in the memory means.

Accordingly, the history-playback mode can be automatically set without user's mode-selection operation.

Preferably, the device further comprises: identification information detecting means for detecting identification information related to one of the tracks from the recording medium when the playback means begins to play back the track recorded on the recording medium during the recording medium playback mode; historical information determining means for determining whether or not the identification information detected by the identification information detecting means is present in the recording-history information stored in the history-storing means; and normal playback completion determining means for determining whether or not the track has been played back normally to the end, when the historical information determining means determines that the identification information is present in the recording-history information. The memory control means updates the recording history included in the recording-history information related to the track in the history-storing means as the latest information, when the normal playback completion determining means determines that the track has been played back normally to the end.

With this arrangement, the recording history information in the history-storing means can be constantly updated.

Preferably, the device further comprises: memory capacity measuring means for measuring the remaining memory capacity in the memory means when the historical information determining means determines that the identification information is not present in the recording-history information; memory capacity calculating means for calculating a required memory capacity for recording the track, on the basis of the identification information; and memory capacity determining means for determining whether or not the memory capacity calculated by the memory capacity calculating means exceeds the remaining memory capacity measured by the memory capacity measuring means. When the memory capacity determining means determines that the memory capacity calculated by the memory capacity calculating means exceeds the remaining memory capacity, the memory control means deletes the oldest playback signal from the memory means so as to produce an unused memory capacity corresponding to the required memory capacity calculated by the memory capacity calculating means, stores in sequence the playback signals of the track being played back by the playback means in the memory means, and stores the recording-history information related to the track in the history-storing means when the normal playback completion determining means determines that the track has been played back normally to the end.

With these features, the playback signals related to a new track can be stored in the storing means.

The memory control means may delete the playback signals being recorded from the memory means when the normal playback completion determining means determines that the track has not been played back normally to the end.

Accordingly, the memory capacity of the storing means can be used efficiently by preventing meaningless storing of the playback signals which have not been normally played back.

Preferably, the memory control means plays back the track related to the playback signals stored in the memory means during the history-playback mode, and updates the recording history included in the recording-history information related to the track in the history-storing means as the latest information, when the normal playback completion determining means determines that the track has been played back normally to the end.

Accordingly, the recording-history information in the history-storing means can be constantly updated.

The device may be mounted in an automobile.

With this arrangement, even if the recording medium is not present in an automobile, the track having the playback signals stored in the storing means can be played back, after the playback signals have been stored in the storing means.

DESCRIPTION OF THE PREFERRED EMBODIMENTS

Figure 1:
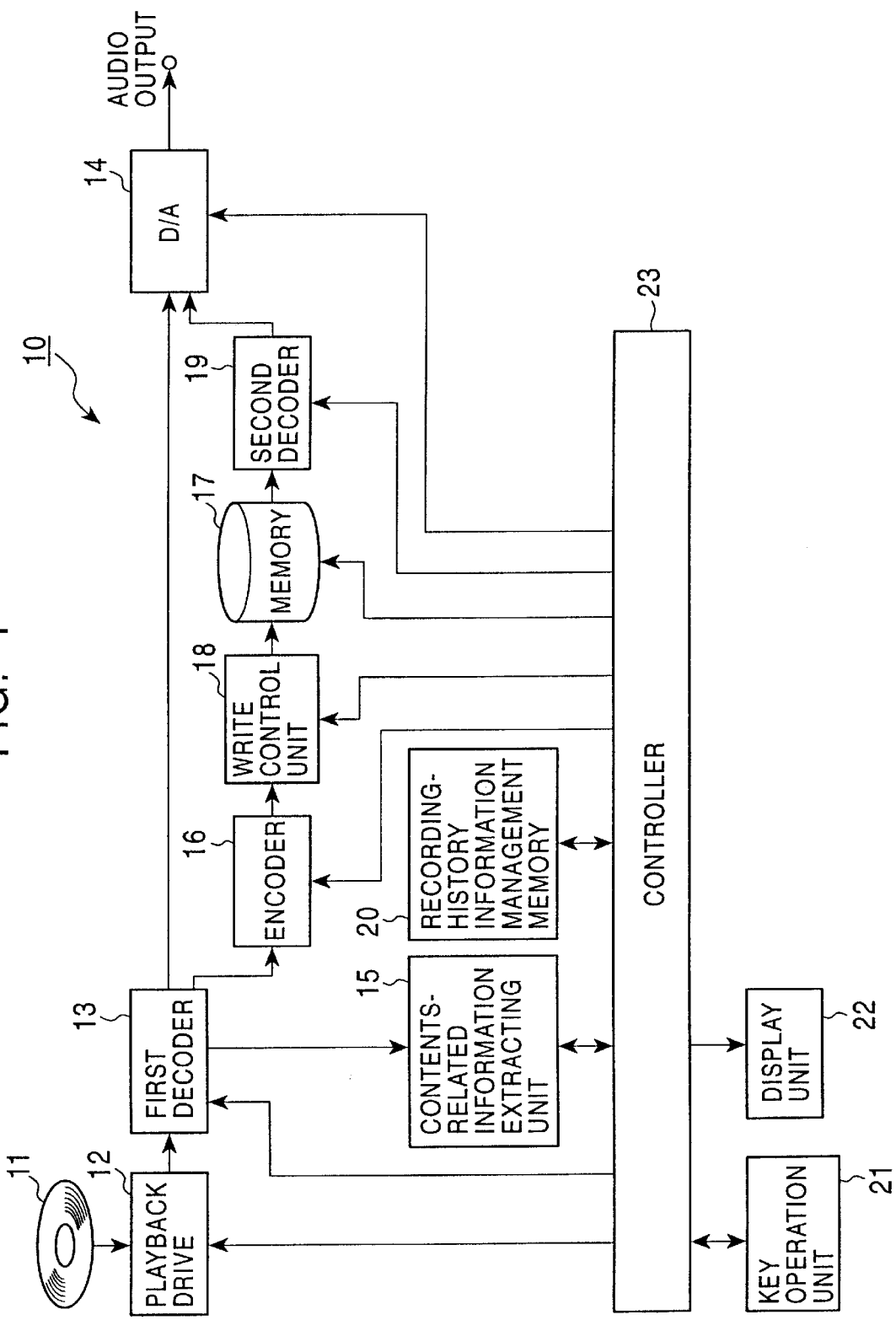
FIG. 1 is a block diagram which schematically shows the internal configuration of a changer device showing embodiments of a device for storing and playing back information recorded on a recording medium of the present invention.

Hereinafter, a changer device of the present invention, which serves as a device for storing and playing back information recorded on a recording medium will be described on the basis of embodiments, with reference to the drawings. FIG. 1 is a block diagram schematically showing an internal configuration of the changer device.

The changer device 10 shown in FIG. 1 is for automobile use and includes: a playback drive 12 for driving and playing back a disk selected from disks 11, though only one disk is depicted for simplicity in FIG. 1; a first decoder 13 for decoding playback signals driven and played back in the playback drive 12; a D/A converter 14 for performing analogue conversion of the playback signals decoded in the first decoder 13 so as to perform audio output of the playback signals; a contents-related information extracting unit 15 for extracting contents-related information in the selected disk 11 from the playback signals decoded in the first decoder 13; an encoder 16 for encoding the playback signals decoded in the first decoder 13; a memory 17; a write control unit 18 for storing the encoded playback signals in the memory 17; a second decoder 19 for decoding the playback signals stored in the memory 17 and transmitting the playback signals to the D/A converter 14; a recording-history information management memory 20 for storing and managing recording-history information of tracks related to the playback signals stored in the memory 17; a key operation unit 21 for inputting various commands; a display unit 22 for displaying various information; and a controller 23 for controlling the whole changer device 10.

The recording-history information includes the contents-related information and recording history related to the tracks stored in the memory 17.

Figure 2:
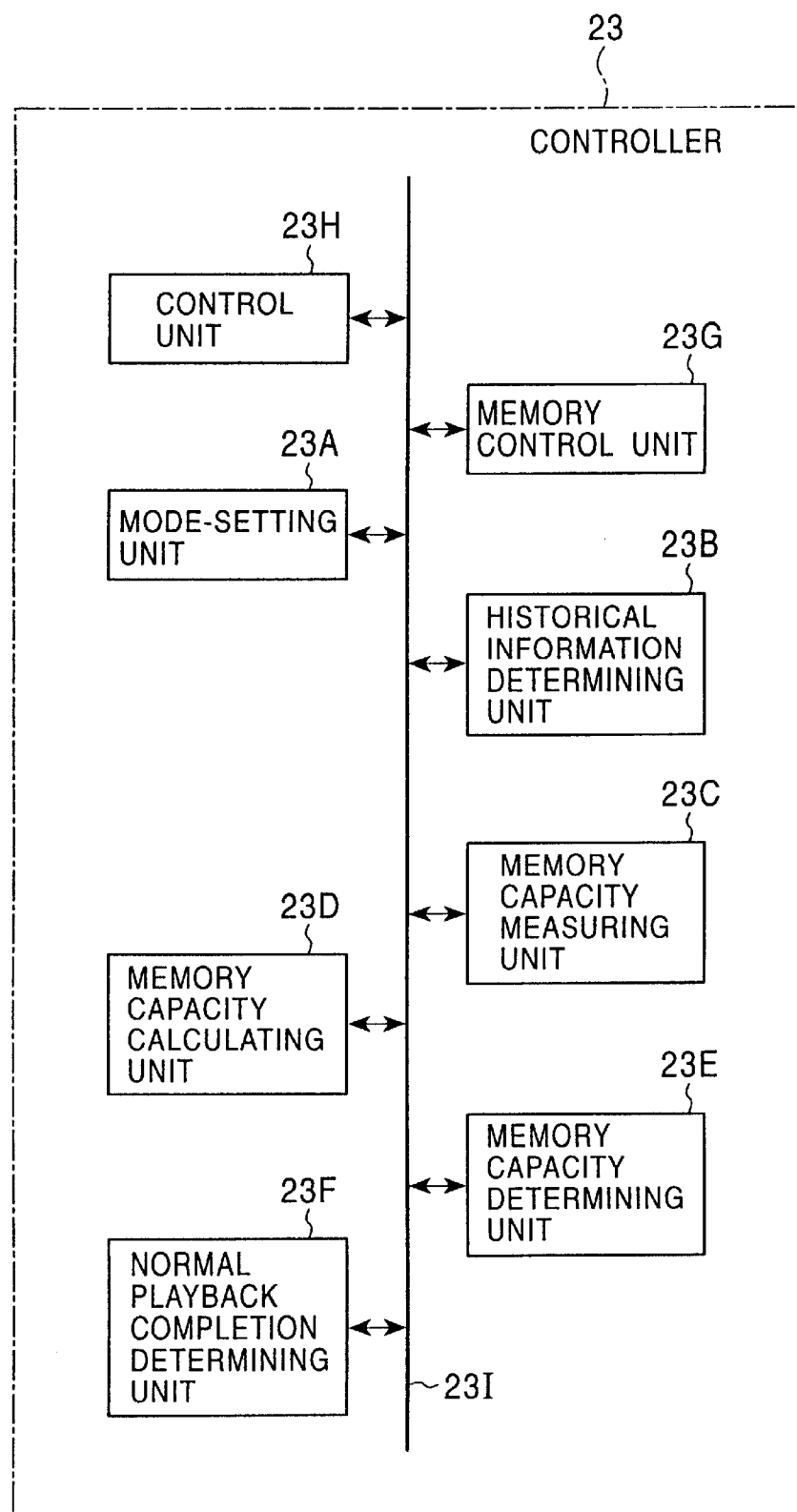
FIG. 2 is a block diagram which schematically shows the internal configuration of a controller of the changer device shown in the embodiments.

FIG. 2 is a block diagram schematically showing an internal configuration of the controller 23 of the changer device 10 of the embodiments.

The controller 23 shown in FIG. 2 includes: a mode-setting unit 23A for switching between a disk-playback mode and a history-playback mode, which are to be described later; a historical information determining unit 23B for determining whether or not a contents ID in the contents-related information extracted in the contents-related information extracting unit 15 is present in the recording-history information stored in the recording-history information management memory 20; a memory capacity measuring unit 23C for measuring remaining memory capacity in the memory 17 when the historical information determining unit 23B determines that the contents ID is not present in the recording-history information; a memory capacity calculating unit 23D for calculating memory capacity required for recording this track, on the basis of playing time in the contents-related information; a memory capacity determining unit 23E for determining whether or not the memory capacity calculated in the memory capacity calculating unit 23D exceeds the remaining memory capacity measured in the memory capacity measuring unit 23C; a normal playback completion determining unit 23F for determining whether or not one of the tracks played back in the playback drive 12 has been normally played back to the end; a memory control unit 23G for storing and controlling the recording-history information management memory 20 and the memory 17; a control unit 23H for controlling the whole controller 23; and a control bus 23I for performing data transmission/receipt for the mode-setting unit 23A, the historical information determining unit 23B, the memory capacity measuring unit 23C, the memory capacity calculating unit 23D, the memory capacity determining unit 23E, the normal playback completion determining unit 23F, the memory control unit 23G, and the control unit 23H.

In the disk-playback mode, the tracks recorded on the disk 11 are played back in the playback drive 12. In the history-playback mode, the tracks related to the playback signals stored in the memory 17 are played back in the memory control unit 23G.

In the present invention, the changer device 10 serves as a device for storing and playing back information recorded on a recording medium. The disk 11 is used as a recording medium. The playback drive 12 functions as playback means. The memory 17 serves as memory means. The recording-history information management memory 20 functions as history-storing means. The memory control unit 23G serves as memory control means. The mode-setting unit 23A serves as mode-setting means. The contents-related information extracting unit 15 functions as identification information detecting means. The historical information determining unit 23B is used as historical information determining means. The normal playback completion determining unit 23F serves as normal playback completion determining means. The memory capacity measuring unit 23C functions as memory capacity measuring means. The memory capacity calculating unit 23D serves as memory capacity calculating means. The memory capacity determining unit 23E is used as memory capacity determining means.

Figure 3:
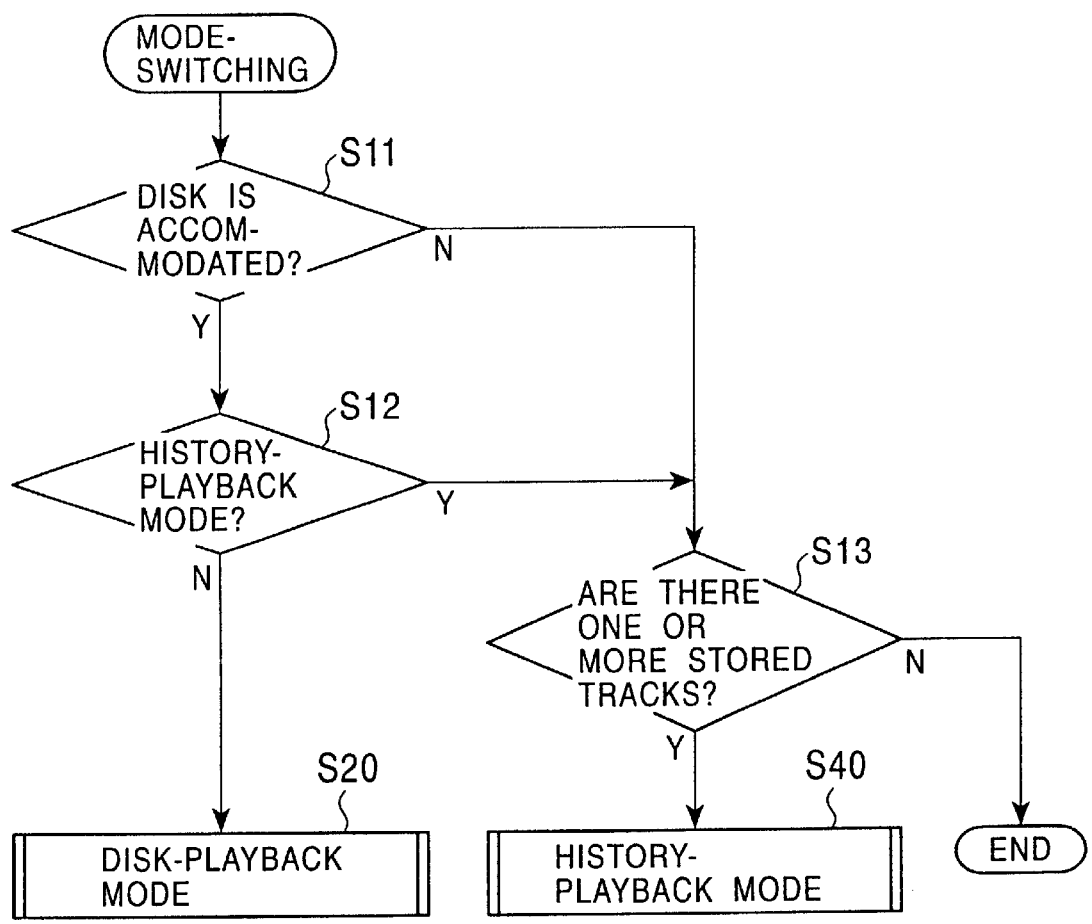
FIG. 3 is a flowchart which shows a processing operation related to mode-switching processing of the controller in the changer device shown in the embodiments.

Subsequently, an operation of the changer device 10 of the embodiments will be described. FIG. 3 is a flow chart showing a processing operation of the controller 23 related to mode-switching processing of the changer device 10 of the embodiments.

In the mode-switching processing shown in FIG. 3, there is switching between the disk-playback mode and the history-playback mode.

In FIG. 3, the control unit 23H of the controller 23 determines whether or not the disk 11 is present in the changer device 10 (step S11). If so, the control unit 23H determines whether or not the current mode is the history-playback mode, by the mode-setting unit 23A (step S12). Setting of the history-playback mode or the disk-playback mode is performed in accordance with a switching operation from the key operation unit 21 or other conditions.

Figure 4:
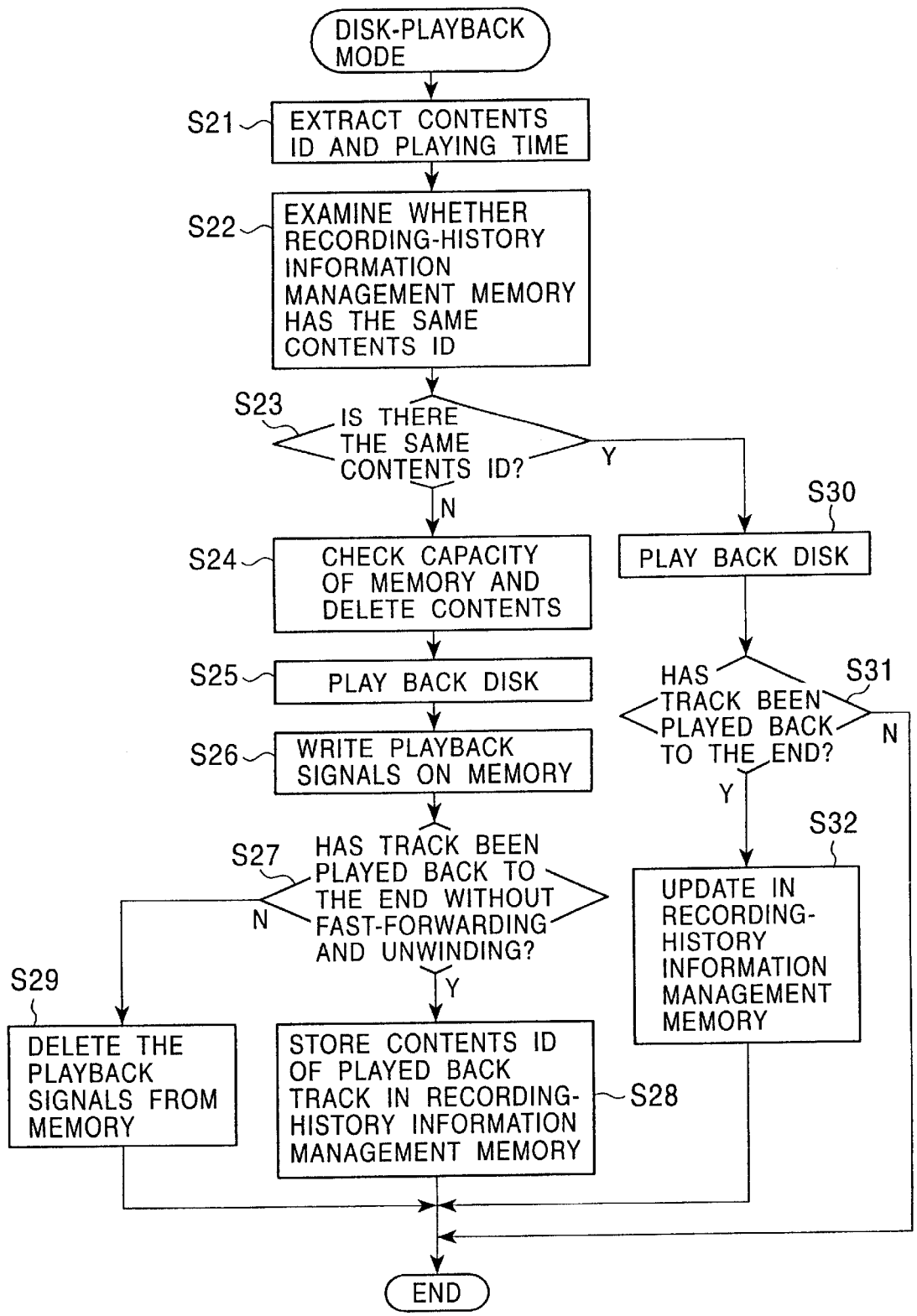
FIG. 4 is a flowchart which shows a processing operation related to a disk-playback mode of the controller in the changer device shown in the embodiments.

If the current mode is not the history-playback mode in step S12, the process proceeds to the disk-playback mode (step S20) shown in FIG. 4.

If the current mode is the history-playback mode in step S12, it is determined whether or not one or more tracks have been stored in the memory 17 (step S13). If one or more tracks have been stored in the memory 17, the process proceeds to the history-playback mode (step S40) shown in FIG. 5.

If the disk 11 is not present in the changer device 10 in step S11, the process proceeds to step S13 in order to determine whether or not one or more tracks have been stored in the memory 17.

If the memory 17 does not have any stored tracks in step S13, the process is completed.

Next, the disk-playback mode in step S20 is described. FIG. 4 is a flow chart showing a processing operation of the controller 23 related to the disk-playback mode.

In the disk-playback mode shown in FIG. 4, the tracks recorded on the disk 11 in the changer device 10 are played back, and the playback signals related to the tracks are stored in the memory 17.

Referring to FIG. 4, the control unit 23H of the controller 23 extracts, through the contents-related information extracting unit 15, contents-related information from the playback signals of the tracks recorded on the disk 11 (step S21).

The historical information determining unit 23B of the controller 23 examines the recording-history information management memory 20 (step S22) and determines whether or not recording-history information including the same contents ID as that in the extracted contents-related information is present in the recording-history information management memory 20 (step S23).

When the historical information determining unit 23B determines that the recording-history information including the same contents ID is not present in the recording-history information management memory 20, the controller 23 checks the remaining capacity of the memory 17 and deletes the contents of the memory 17 (step S24).

In step S24, the memory capacity measuring unit 23C of the controller 23 measures the remaining memory capacity of the memory 17. Further, the memory capacity calculating unit 23D of the controller 23 calculates memory capacity required for storing this track, on the basis of the playing time in the contents-related information. The memory capacity determining unit 23E of the controller 23 determines whether or not the memory capacity calculated in the memory capacity calculating unit 23D exceeds the current remaining memory capacity in the memory 17.

When the memory capacity determining unit 23E determines that the memory capacity required for recording the track exceeds the current remaining memory capacity, the memory control unit 23G of the controller 23 deletes the oldest recorded track in the memory 17 from the memory 17, on the basis of the recording history in the recording-history information stored in the recording-history information management memory 20. The memory control unit 23G continues deleting the oldest track until the memory 17 has sufficient memory capacity for storing the track.

The memory control unit 23G deletes the recording-history information corresponding to the deleted track from the recording-history information management memory 20 as well as the track stored in the memory 17.

When the memory capacity determining unit 23E determines that the memory capacity required for storing the track does not exceed the remaining memory capacity, the control unit 23H of the controller 23 ends the check and deletion and produces an unused memory capacity in the memory 17.

Then, the control unit 23H of the controller 23 plays back the track recorded on the disk 11, by means of the playback drive 12 (step S25).

The memory control unit 23G of the controller 23 controls the write control unit 18 so as to store the playback signals related to the track being played back in the playback drive 12 in the memory 17 (step S26).

The normal playback completion determining unit 23F of the controller 23 determines whether or not playback of the track has been completed normally from beginning to end, without fast-forwarding and unwinding (step S27).

When the normal playback completion determining unit 23F determines that normal playback has been completed, the memory control unit 23G of the controller 23 stores the recording-history information including the contents-related information and the recording history of the track which has been played back in the recording-history information management memory 20 (step S28), and the processing operation ends.

If the normal playback completion determining unit 23F determines that normal playback has not been completed in step S27, the memory control unit 23G decides that the track has not been normally stored in the memory 17 and deletes the playback signals related to the track stored in the memory 17 from the memory 17 (step S29), so as to complete the processing operation.

If the historical information determining unit 23B determines that the same contents ID is present in the recording-history information management memory 20 in step S23, the playback drive 12 plays back the track having the contents ID (step S30).

The normal playback completion determining unit 23F of the controller 23 determines whether or not the track has been played back normally from beginning to end without fast-forwarding and unwinding (step S31).

When the normal playback completion determining unit 23F determines that normal playback has been completed, the memory control unit 23G of the controller 23 updates the recording-history information related to the played back track as the latest information in the recording-history information management memory 20 (step S32), so as to complete the processing operation. The latest information is the track that has been played back most currently and is for update of recording history in the recording-history information.

If the normal playback completion determining unit 23F determines that the playback has not been completed normally in step S31, the processing operation is completed without updating the recording-history information in the recording-history information management memory 20.

Figure 5:
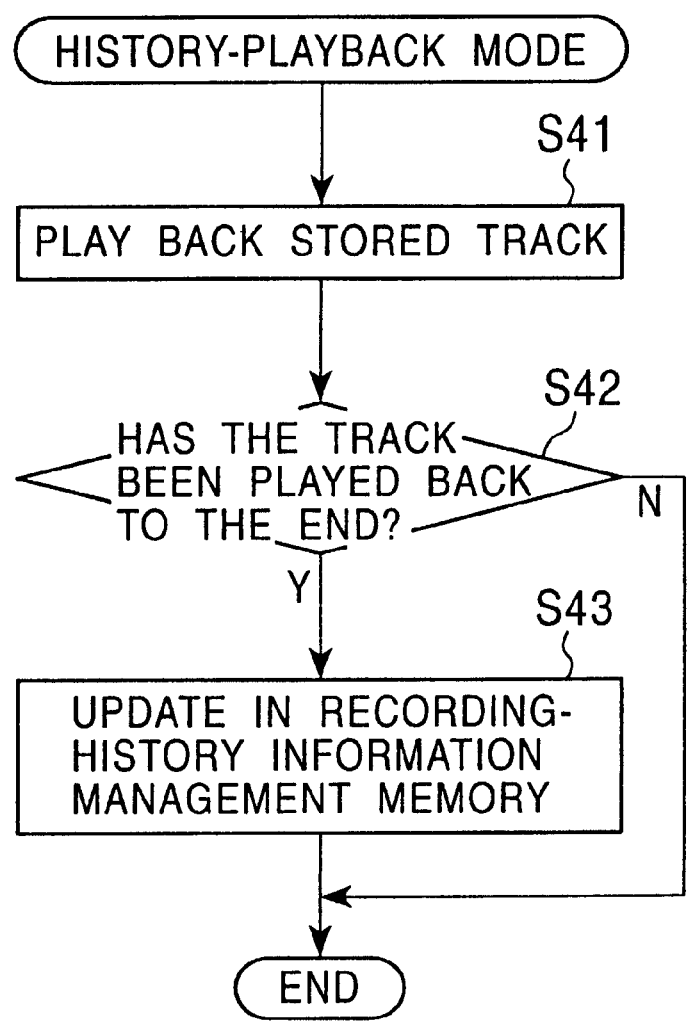
FIG. 5 is a flowchart which shows a processing operation related to a history-playback mode of the controller in the changer device shown in the embodiments.
Figure 6:
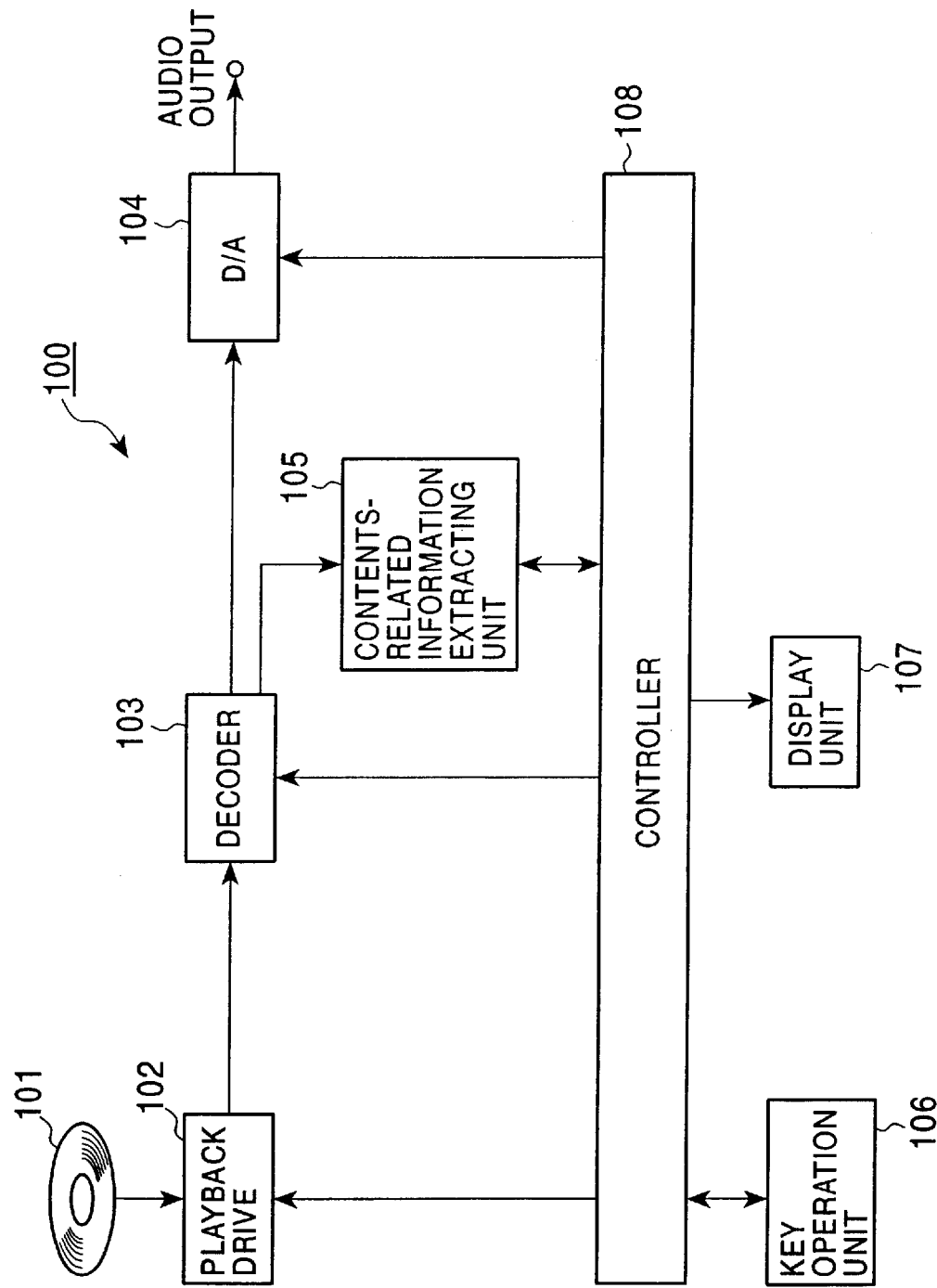
FIG. 6 is a block diagram which schematically shows the internal configuration of a changer device functioning as a device for storing and playing back information recorded on a recording medium of the known art.

Subsequently, the history-playback mode in step S40 is described. FIG. 5 is a flow chart showing a processing operation of the controller 23 related to the history-playback mode.

In the history-playback mode shown in FIG. 5, the playback signals stored in the memory 17 are played back.

In FIG. 5, the memory control unit 23G of the controller 23 reads the playback signals stored in the memory 17 and plays back the read playback signals as the stored track (step S41).

The normal playback completion determining unit 23F of the controller 23 determines whether or not the track has been played back normally from beginning to end without fast-forwarding and unwinding (step S42).

When the normal playback completion determining unit 23F determines that normal playback has been completed, the memory control unit 23G of the controller 23 updates the recording-history information related to the played back track in the recording-history information management memory 20 as the latest information (step S43), so as to complete the processing operation.

If the normal playback completion determining unit 23F determines that playback has not been completed normally in step S42, the processing operation is completed without updating the recording-history information in the recording-history information management memory 20.

What is claimed is:

1. A device for storing and playing back information recorded on a recording medium, comprising:
    playback means for playing back a plurality of tracks recorded on said recording medium, to generate playback signals;
    memory means for storing the playback signals;
    history-storing means for storing recording-history information of the tracks related to the playback signals stored in said memory means; and
    memory control means for allowing said memory means to store in sequence the playback signals of the tracks played back by said playback means, and for allowing said history-storing means to store the recording-history information of the tracks related to the playback signals stored in said memory means.

2. The device according to claim 1, wherein the recording-history information includes identification information and recording history related to the tracks stored in said memory means.

3. The device according to claim 1, further comprising mode-setting means for switching between a recording medium playback mode in which the tracks recorded on said recording medium are played back by said playback means and a history-playback mode in which the tracks related to the playback signals stored in said memory means are played back by said memory control means.

4. The device according to claim 3, wherein said history-playback mode is set by said mode-setting means when said recording medium is not present in said device and when the playback signals are stored in said memory means.

5. The device according to claim 3, further comprising:
    identification information detecting means for detecting identification information related to one of the tracks from said recording medium when said playback means begins to play back the track recorded on said recording medium during said recording medium playback mode;
    historical information determining means for determining whether or not the identification information detected by said identification information detecting means is present in the recording-history information stored in said history-storing means; and
    normal playback completion determining means for determining whether or not the track has been played back normally to the end, when said historical information determining means determines that the identification information is present in the recording-history information,
    wherein said memory control means updates the recording history included in the recording-history information related to the track in said history-storing means as the latest information, when said normal playback completion determining means determines that the track has been played back normally to the end.

6. The device according to claim 5, further comprising:
    memory capacity measuring means for measuring the remaining memory capacity in said memory means when said historical information determining means determines that the identification information is not present in the recording-history information;
    memory capacity calculating means for calculating a required memory capacity for recording the track, on the basis of said identification information; and memory capacity determining means for determining whether or not the memory capacity calculated by said memory capacity calculating means exceeds the remaining memory capacity measured by said memory capacity measuring means, wherein, when said memory capacity determining means determines that the memory capacity calculated by said memory capacity calculating means exceeds the remaining memory capacity, said memory control means deletes the oldest playback signal from said memory means so as to produce an unused memory capacity corresponding to the required memory capacity calculated by said memory capacity calculating means, stores in sequence the playback signals of the track being played back by said playback means in said memory means, and stores the recording-history information related to the track in said history-storing means when said normal playback completion determining means determines that the track has been played back normally to the end.

7. The device according to claim 6, wherein said memory control means deletes the playback signals being recorded from said memory means when said normal playback completion determining means determines that the track has not been played back normally to the end.

8. The device according to claim 4, wherein said memory control means plays back the track related to the playback signals stored in said memory means during said history-playback mode, and updates the recording history included in the recording-history information related to the track in said history-storing means as the latest information, when said normal playback completion determining means determines that the track has been played back normally to the end.

9. The device according to claim 1, wherein said device is mounted in an automobile.

10. The device according to claim 2, further comprising mode-setting means for switching between a recording medium playback mode in which the tracks recorded on said recording medium are played back by said playback means and a history-playback mode in which the tracks related to the playback signals stored in said memory means are played back by said memory control means.

11. The device according to claim 5, wherein said memory control means plays back the track related to the playback signals stored in said memory means during said history-playback mode, and updates the recording history included in the recording-history information related to the track in said history-storing means as the latest information, when said normal playback completion determining means determines that the track has been played back normally to the end.

12. The device according to claim 6, wherein said memory control means plays back the track related to the playback signals stored in said memory means during said history-playback mode, and updates the recording history included in the recording-history information related to the track in said history-storing means as the latest information, when said normal playback completion determining means determines that the track has been played back normally to the end.

13. The device according to claim 7, wherein said memory control means plays back the track related to the playback signals stored in said memory means during said history-playback mode, and updates the recording history included in the recording-history information related to the track in said history-storing means as the latest information, when said normal playback completion determining means determines that the track has been played back normally to the end.

* * * * *